(12) United States Patent
Matikkala

(10) Patent No.: US 10,416,343 B2
(45) Date of Patent: Sep. 17, 2019

(54) IONIZING RADIATION IMAGE DATA CORRECTION

(71) Applicant: Detection Technology Oy, Oulu (FI)

(72) Inventor: Mikko Matikkala, Oulu (FI)

(73) Assignee: Detection Technology Oy, Oulu (FI)

( * ) Notice: Subject to any disclaimer, the term of this patent is extended or adjusted under 35 U.S.C. 154(b) by 245 days.

(21) Appl. No.: 15/546,834

(22) PCT Filed: Jan. 26, 2016

(86) PCT No.: PCT/FI2016/050040
§ 371 (c)(1),
(2) Date: Jul. 27, 2017

(87) PCT Pub. No.: WO2016/120526
PCT Pub. Date: Aug. 4, 2016

(65) Prior Publication Data
US 2018/0024268 A1    Jan. 25, 2018

(30) Foreign Application Priority Data

Jan. 27, 2015   (EP) ..................................... 15152651

(51) Int. Cl.
*G01V 5/00*    (2006.01)
(52) U.S. Cl.
CPC .................. *G01V 5/0041* (2013.01)
(58) Field of Classification Search
CPC .................................................. G01V 5/0041
See application file for complete search history.

(56) References Cited

U.S. PATENT DOCUMENTS

| 5,841,832 A | 11/1998 | Mazess et al. |
| 2007/0286337 A1 | 12/2007 | Wang et al. |
| 2010/0119038 A1 | 5/2010 | Suyama et al. |

FOREIGN PATENT DOCUMENTS

| CN | 101074935 A | 11/2007 |
| CN | 101576513 A | 11/2009 |

(Continued)

OTHER PUBLICATIONS

Chinese Search Report for corresponding Chinese Patent Application No. 2016800152016 dated May 24, 2018, 1 pg.

(Continued)

*Primary Examiner* — Hugh Maupin
(74) *Attorney, Agent, or Firm* — Merchant & Gould P.C.

(57) ABSTRACT

In one example, an image data correction device is configured to an ionizing radiation detection device, wherein the ionizing radiation detection device is configured to detect ionizing radiation in a plurality of energy ranges transmitted through an object to which radiation is irradiated from a radiation source, the radiation detection device comprising: a first detector for detecting ionizing radiation in a first energy range that is transmitted through the object to generate first radiation image data; a second detector configured in parallel to the first detector with a predetermined region sandwiched between the first and the second detectors, for detecting ionizing radiation in a second energy range that is transmitted through the object to generate second radiation image data. The first and the second detectors are configured to receive the ionizing radiation concurrently so that the first and the second image data are generated concurrently. The image data correction device comprises; at least one processor, and at least one memory storing program instructions that, when executed by the at least one processor, cause the device to: digitally determine a correction value for the second radiation image data based on a width of the prede- (Continued)

termined region. In other examples a method and a computer program product has been discussed along with the features of the image data correction device.

16 Claims, 11 Drawing Sheets

(56) References Cited

FOREIGN PATENT DOCUMENTS

| | | |
|---|---|---|
| JP | H04-2907 A | 1/1992 |
| WO | WO 2010/092368 A2 | 8/2010 |

OTHER PUBLICATIONS

International Search Report and Written Opinion of the International Searching Authority for corresponding International Patent Application No. PCT/FI2016/050040 dated Apr. 21, 2016, 10 pages.
Extended European Search Report for corresponding European Patent Application No. 15152651.4 dated Jul. 24, 2015, 7 pages.

IONIZING RADIATION IMAGE DATA CORRECTION

This application is a National Stage Application of PCT/FI2016/050040, filed 26 Jan. 2016, which claims benefit of Ser. No. 15/152,651.4, filed 27 Jan. 2015 with the European Patent Office and which applications are incorporated herein by reference. To the extent appropriate, a claim of priority is made to each of the above disclosed applications.

BACKGROUND

Conventionally, it has been common to allow ionizing radiation, such as X-rays or gamma rays, to transmit through an object being a specimen such as food, drugs, luggage, human or animal body, etc. and make an inspection based on a transmission ionizing radiation image to determine the object, for example an existence of a different kind of substances in an object. For such an inspection, an ionizing radiation image acquiring device, including an ionizing radiation source for irradiating ionizing radiation to the object, and a linear line sensor for detecting a transmission image of ionizing radiation irradiated to the object from the ionizing radiation source, has been used.

Use of a dual energy is known in this field. In dual energy imaging, two separate image frames are taken. Each image frame is at a different energy level or a radiation spectrum. This may be achieved by using different filtering or different acceleration voltage, etc. The dual energy is based on the fact that dominant interactions of ionizing radiation in materials differ at different energies. This difference is material specific. This makes it possible to enhance a detection of certain unknown materials. Especially with respect to known thickness of known materials, by removing the known material form the image data. For the purpose of these calculations, high energy data and low energy data are taken from the same volume of the material.

Dual energy imaging can basically be configured in three ways. 1) By taking two separate images one after another at different energies, either using two different tubes, or one tube with different energy and filtering, and also matching detectors. 2) By imaging the object in one shot with one tube setting, but using a sandwich detector, where a top layer is optimized for low energy, and filtering the beam for the second detector optimized for the high energy. 3) By placing the detectors not on top of each other but one after another. Consequently, the detectors can be placed in parallel to each other. The dual energy system can be based on the side by side, i.e. in parallel, detectors.

Publications U.S. Pat. No. 5,841,832A and US2010119038A1 discusses information that can be regarded as useful for understanding the background.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In one example, an image data correction device is configured to an ionizing radiation detection device, wherein the ionizing radiation detection device is configured to detect ionizing radiation in a plurality of energy ranges transmitted through an object to which radiation is irradiated from a radiation source, the radiation detection device comprising: a first detector for detecting ionizing radiation in a first energy range that is transmitted through the object to generate first radiation image data; a second detector configured in parallel to the first detector with a predetermined region sandwiched between the first and the second detectors, for detecting ionizing radiation in a second energy range that is transmitted through the object to generate second radiation image data. The first and the second detectors are configured to receive the ionizing radiation concurrently so that the first and the second image data are generated concurrently.

The image data correction device comprises; at least one processor, and at least one memory storing program instructions that, when executed by the at least one processor, cause the device to: digitally determine a correction value for the second radiation image data based on a width of the predetermined region.

In other examples a method and a computer program product has been discussed along with the features of the image data correction device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples may be described and illustrated herein as being implemented in an X-ray radiation source and X-ray detection device, these are only examples of an ionizing radiation source and detection device and not a limitation. For example, gamma radiation source and detection devices may be applicable. As those skilled in the art will appreciate, the present examples are suitable for application in a variety of different types of radiation sources and detection devices and correction devices, for example, in a correction device for digital imaging, etc.

Figure 1:
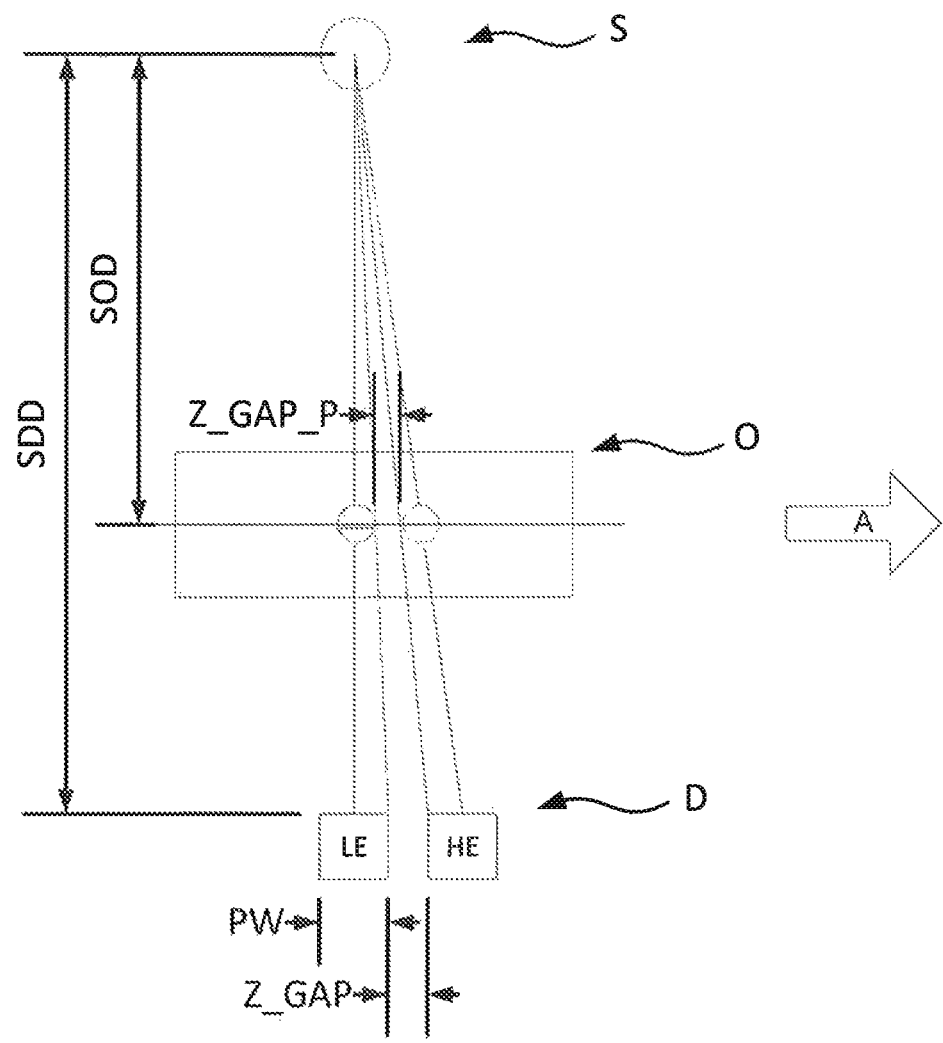
FIG. 1 illustrates an example of an imaging geometry.

An example of an imaging geometry is illustrated in FIG. 1. The X-ray radiation detection apparatus comprises a radiation source, S. The radiation source, S, is configured to irradiate ionizing radiation, such as X-rays to an object, O, to be inspected. A low energy detector, LE, and a high energy detector, HE, are configured to detect the radiation having been transmitted through the object O. A miss-alignment of the LE and HE images is caused by a finite gap, Z_GAP, between the LE and HE detectors in a scanning direction (as shown by an arrow, A). Consequently a pre-determined region, such as the gap Z_GAP, is sandwitched between the first, LE, detector and the second, HE, detector. Consequently, the gap Z_GAP is projected, Z_GAP_P at an object level causing the miss-alignment. The gap Z_GAP is projected to an image, representing the object O. This depends on a system geometrical magnification, M, of the detection device. The magnification M is defined by a source S to a detector D distance, SDD. The magnification M is further defined by a source S to an object O distance, SOD. The magnification M is represented by the following equation:

$$M = SDD/SOD. \quad \text{(Equation \#0)}$$

Figure 2:
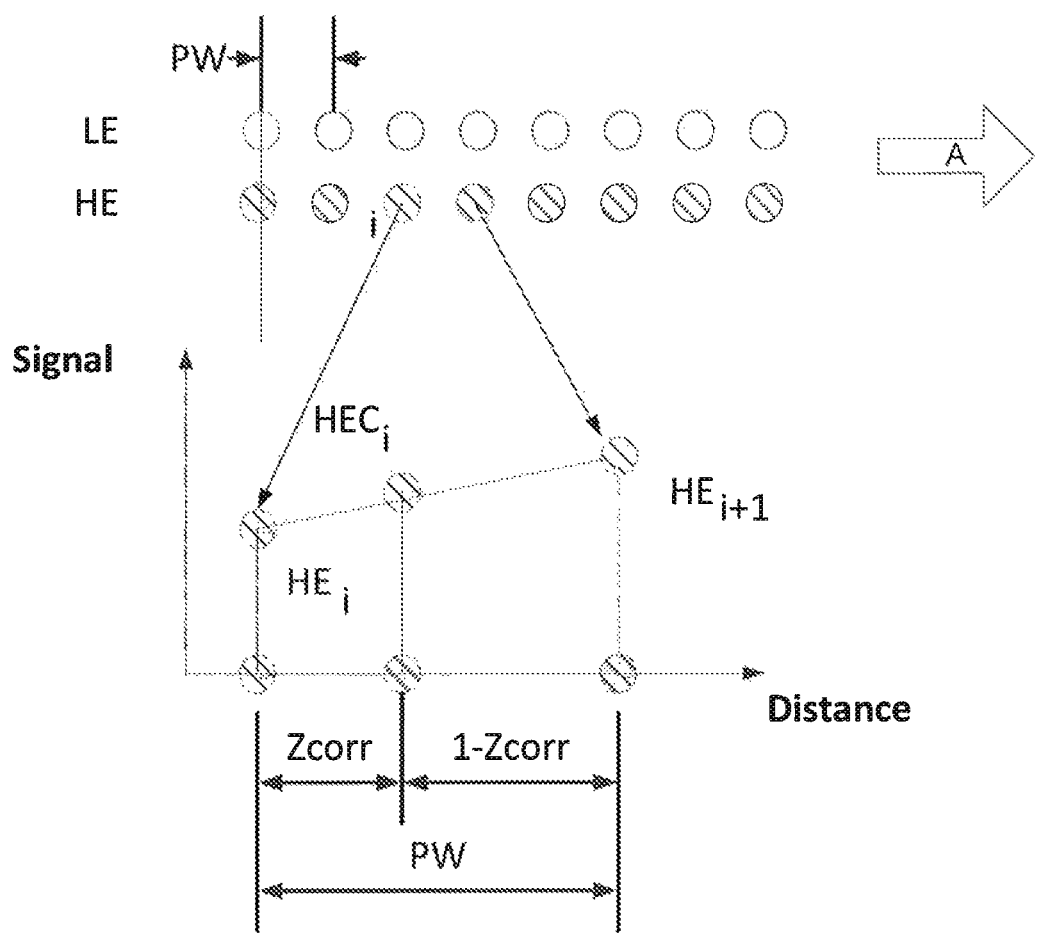
FIG. 2 illustrates sampled signals and corrected values, in accordance with an illustrative example.

FIG. 2 illustrates sampled signals and corrected values, in accordance with an illustrative example. The first and the second detectors are configured to receive the ionizing radiation concurrently so that the first and the second image data are generated concurrently. For example, the signal of the detectors is sampled concurrently. The digital correction enables the concurrent generation of image data and sampling. There is no need to specifically separate and process the generation of the image data. The system geometrical magnification M is thus represented by M=SDD/SOD. Consequently, the projected gap between the LE detector and the HE detector is represented by an equation:

$$Z\_GAP\_P = Z\_GAP/M. \quad \text{(Equation \#1)}$$

The LE and HE signal is sampled by one line scanner (not shown in the figures). Sampled LE values are shown by circles, and sampled HE values are shown by circles with hatching. A vertical axis illustrates a signal and a horizontal axis illustrates a distance. The distance is subject to the scanning direction A. The integration period is set so that a dimensional sampling is equal to a pixel pitch PW as for example shown in FIG. 1. For example, in FIG. 1 the pixel pitch PW is equal to a width of the LE detector. Furthermore, the pixel pitch PW is illustrated in FIG. 2 between the LE values, as shown by the circles. A correction is performed in a digital domain. The correction is based on a correction value Zcorr, which is based on results of a dimensional domain, for example measure in an analog or a physical domain. Because the correction value Zcorr is determined in the digital domain, the correction can be done also after the image scanning, and possibly fine-tuned for the best result. Various iterations may be digitally applied. The manual entry of the correction value may further be applied. For example, the user can manually enter, or fine tune, the correction value. Furthermore implementation of the X-ray detection device may be simple, because of the digital correction. There is no need to have more complicated analog correction, etc.

Referring to FIG. 2, the correction value Zcorr is a ratio between the projected gap Z_GAP_P and the pixel pitch PW. The following equation represents the correction value Zcorr:

$$Zcorr = Z\_GAP\_P/PW = Z\_GAP/M*(1/PW). \quad \text{(Equation \#2)}$$

A new corrected value HEC for the HE sample value is calculated based on a weighted sum of the two consecutive samples for each pixel. The weighting factor is the correction ration. The example of FIG. 2 applies for correction value Z_corr<=1. The new value for HEC is represented by:

$$HEC_{i,ch} = (1-Zcorr)*HE_{i,ch} + Zcorr*HE_{i+1,ch}, \quad \text{(Equation \#3)}$$

where i represents the line or sample index in the scanning direction A, and ch represents a pixel index.

Figure 3:
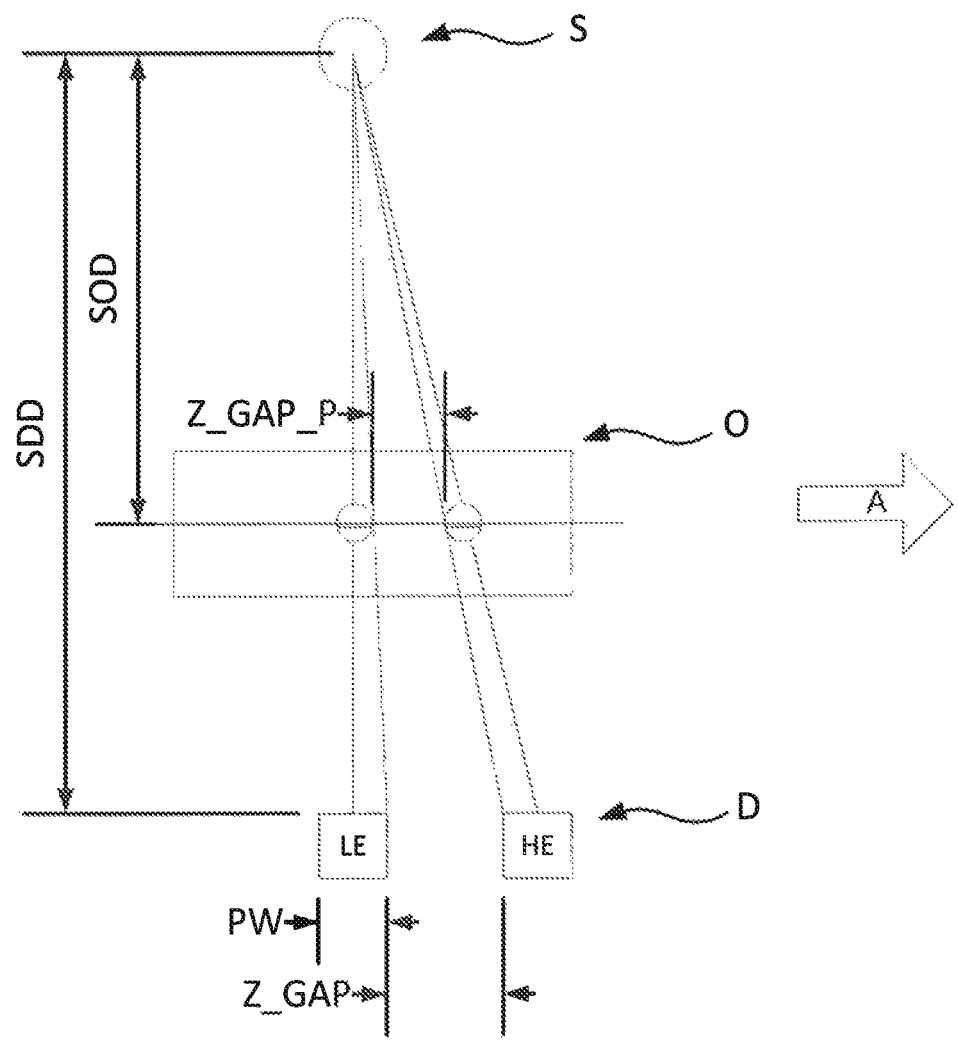
FIG. 3 illustrates another example of an imaging geometry.
Figure 4:
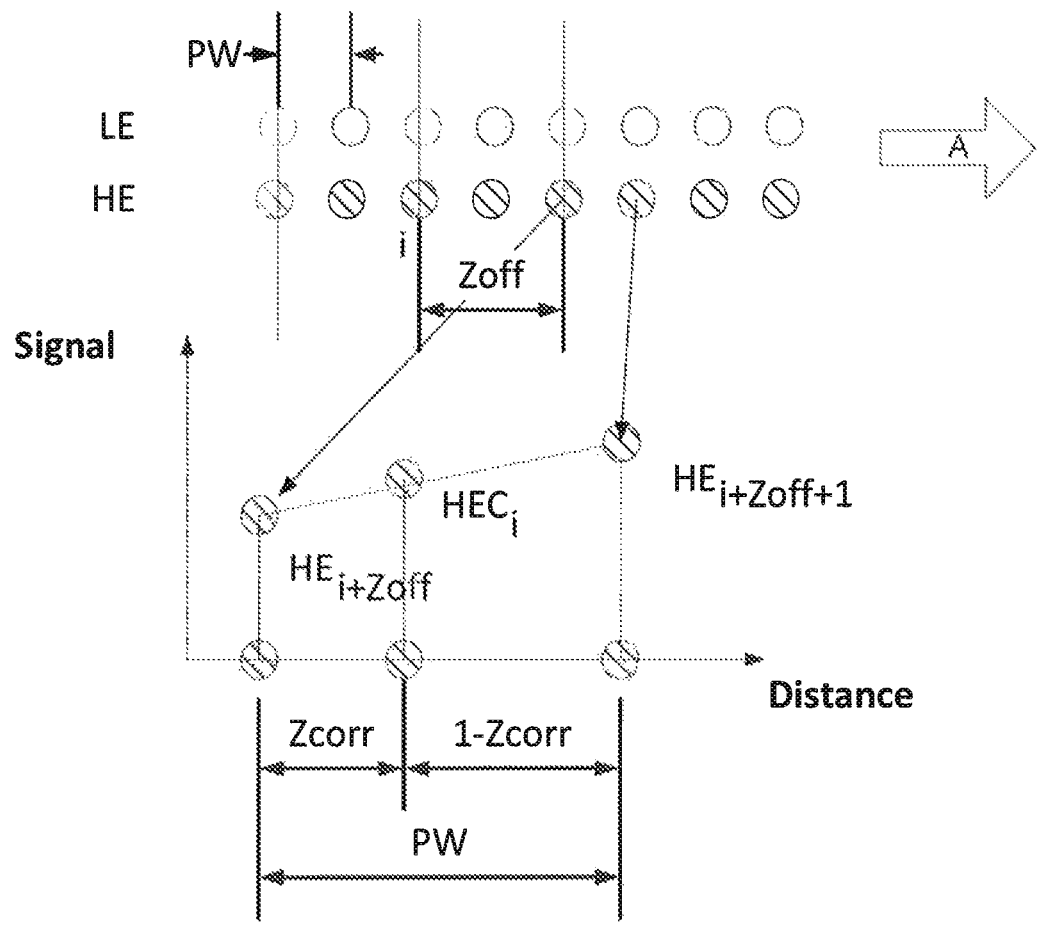
FIG. 4 illustrates sampled signals and corrected values, in accordance with an illustrative example.

FIG. 3 illustrates an example of another imaging geometry. In examples of FIG. 1 and FIG. 2 the gap Z_GAP between LE and HE detector is less than the pixel pitch PW. Example of FIG. 3 relates to a situation where the gap Z_GAP may be longer than the pixel pitch PW. In order to hand the gaps Z_GAP, which are longer than pixel pitch PW, the determination and calculation is modified as illustrated in FIG. 4. At first, a projected ratio RATIO between a gap Z_GAP and pixel pitch PW is calculated for example according to the following equation:

$$RATIO = Z\_GAP\_P/PW = Z\_GAP/M*(1/PW). \quad \text{(Equation \#4)}$$

Two correction values, Zoff and Zcorr, may be then defined as follows:

Zoff represents the rounded-down integer part of the RATIO added with one.

For example, when RATIO is 1.56=>Zoff=1+1=2. (Equation #5)

Zcorr represents the decimal part of the RATIO

For example, when RATIO is 1.56=>Zcorr=0.56. (Equation #6)

A new corrected value HEC may be based on a correction equation which is updated as follow:

$$HEC_{i,ch} = (1-Zcorr)*HE_{i+zoff,ch} + Zcorr*HE_{i+zoff+1,ch}, \quad \text{(Equation \#7)}$$

where i represents the line or sample index in a scanning direction A, and ch represents the pixel index.

Figure 5:
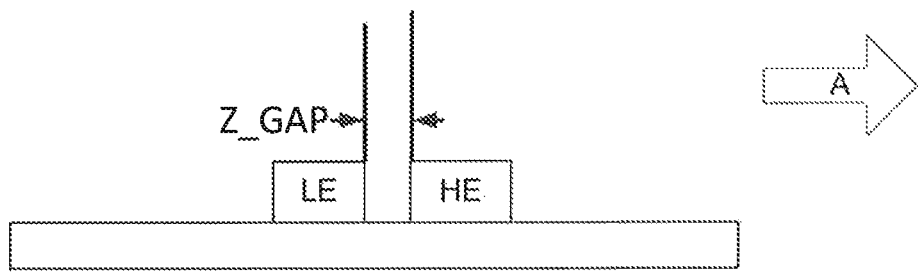
FIG. 5 illustrates an example of a detector.

FIG. 5 illustrates an example a gap of a detector. The gap Z_GAP is shown between the LE detector and the HE detector. The gap is situated between the detectors in the scanning direction A. The width of the gap may be 0.8 mm. Typically the distance between the detectors is set to be as narrow as possible. However, the gap is required due to achieve a correct detection and to prevent the detectors to leak, or disturb, each other.

Figure 6:
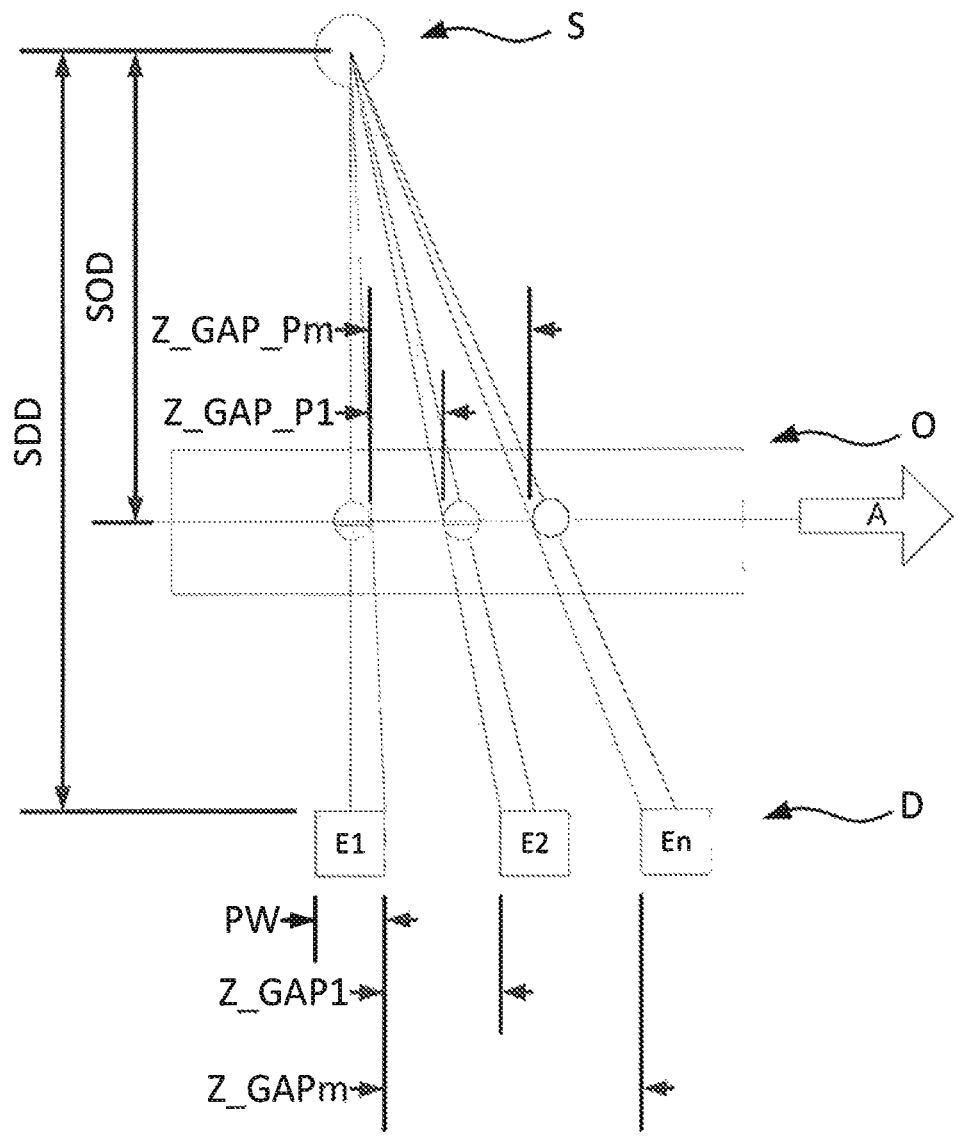
FIG. 6 illustrates another example of a multi-energy detector imaging geometry.
Figure 7:
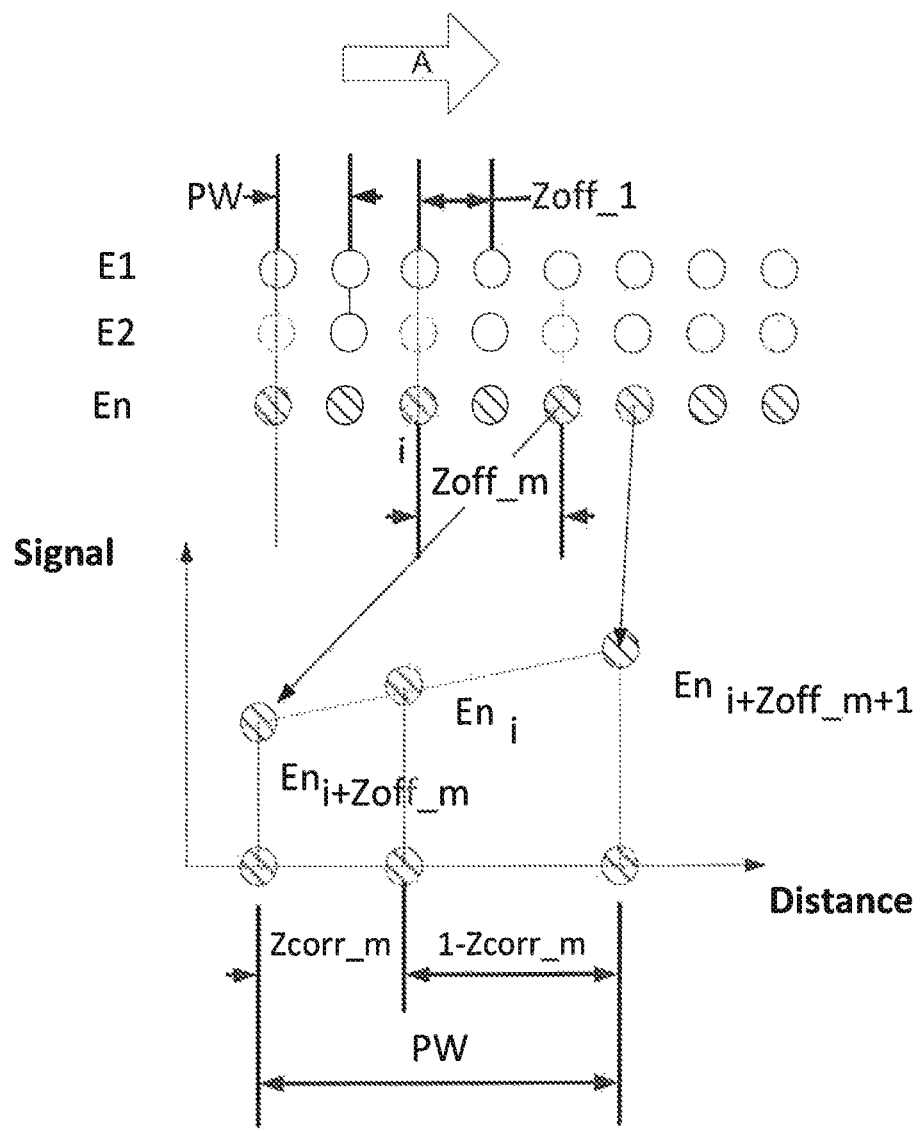
FIG. 7 illustrates sampled signals and corrected values, in accordance with an illustrative example.

FIG. 6 illustrates an example of another imaging geometry. FIG. 6 illustrates a multiple energy example. In the example of FIG. 6 there are multi-energy detectors E1, E2, En. For example, there can be n number of detectors. The detectors are configured to receive the ionizing radiation concurrently so that the various image data are generated concurrently. For example, the signal of the detectors is sampled concurrently. FIG. 7 illustrates the sampled signals and corrected values in the example of multi-energy detectors. Consequently, the number of samples in the object O correspondences with this. The projected gap Z_GAP_P_m between the detectors is represented by an equation:

$$Z\_GAP\_P\_m = Z\_GAP\_m/M. \quad \text{(Equation \#8)}$$

The projected ration RATIO between a gap Z_GAP_m and the pixel pitch PW is calculated based on an equation:

$$RATIO\_m = Z\_GAP\_P\_m/PW = Z\_GAP\_m/M*(1/PW). \quad \text{(Equation \#9)}$$

The two correction values, Zoff_m and Zcorr_m, may be defined as follows:

Zoff m represents the rounded-down integer part of the RATIO m added with one. For example, when RATIO_1 is 1.56=>Zoff 1=1+1=2.

Zcorr_m represents the decimal part of the RATIO m. For example, when RATIO_1 is 1.56=>Zcorr_1=0.56.

The new corrected value E may be based on the correction equation which is as follows:

$$En_{i,ch}=(1-Zcorr\_m)*En_{i+zoff\_m,ch}+Zcorr\_m*En_{i+zoff\_m+1,ch}, \text{ where } m=n-1 \quad \text{(Equation #10)}.$$

Figure 8:
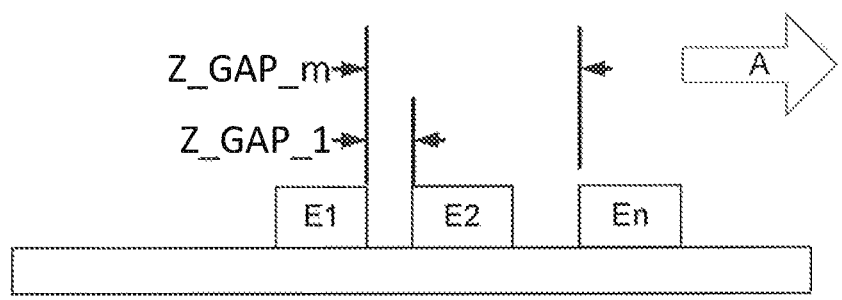
FIG. 8 illustrates another example of a detector.

FIG. 8 illustrates gaps of multi-energy detectors. A gap Z_GAP_1 is shown between the E1 detector and the E2 detector. Another gap Z_GAP_m is shown between the detector E1 and the detector En, where n is the n:th detector, and m=n−1. The gaps are situated between the detectors in the scanning direction A. The width of the gap Z_GAP_1 may be 0.8 mm.

Figure 9:
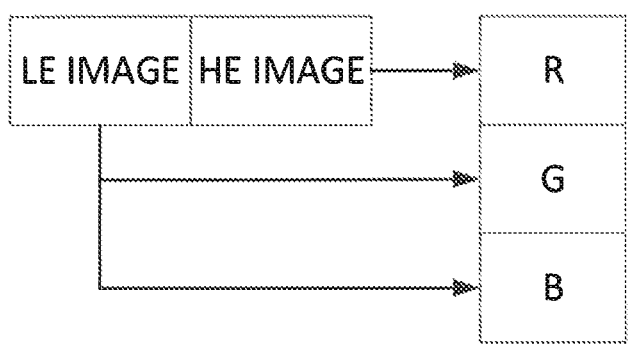
FIG. 9 illustrates an example of a further correction, in accordance with an illustrative example.

FIG. 9 illustrates an example of a further correction, which is based on a color overlay alignment image. In order to improve the checking procedure of the LE or HE value registration, the color overlay alignment image may be used for further adjustment. In the example of FIG. 9 RGB illustrates the color coding model with blue B, green G and Red R channels. A color image is produced from LE data and HE data. LE image data is fed to blue B and green G channels. The HE image data is fed to the red, R, channel. The data can be scaled to 8-bit before color, RGB, processing, or after the processing. An image of the output of further correction can be inspected for further adjustment. If LE data and HE data are separated in the image, the LE part of the data will show as blue in the image, and the HE part of the data will show as red in the image. This may illustrate about any possible miss-alignment of the device. If the LE data or HE data is alignment, for example registered, the image feature is shown as black. This may illustrate that the settings of the device are appropriate. Consequently, the color overlay alignment image may be used to further correct the ionizing detection device. For example, the negative effect of the gap Z_GAP may be reduced in the detection, etc.

Figure 10:
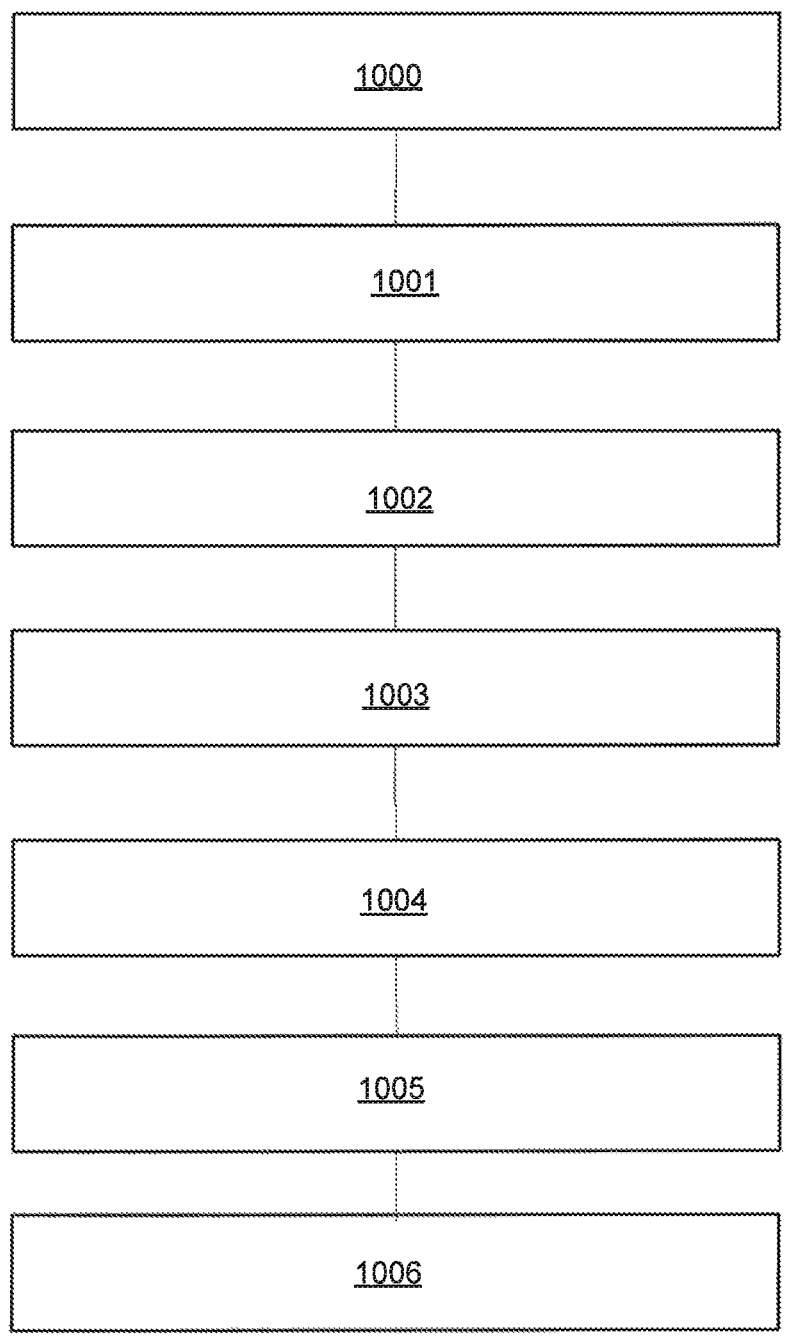
FIG. 10 is a schematic flow diagram of a method, in accordance with an illustrative example.

FIG. 10 illustrates a schematic flow diagram of a method for LE or HE registration correction in a scanning direction A, for example Z-axis. In the step 1000, a gap Z_GAP is measured. For example, the physical distance is measured by a measurement micro-scope after detector assembly. In the step 1001, the measurement values are stored. For example, the measurement values are stored in an on-board flash memory of the scanner device control-board. In the step 1002, system geometry information is received. For example, a user of the detection device inputs the information about the system imaging geometry, SDD and SOD values, in an application software, and information is fed to a library level correction function of the correction device. In the step 1003, a correction function calculates the correction value Zcorr, and possibly the correction value Zoff. In the step 1004, the correction value(s) is applied into the dark and gain corrected image data. For example, during the image processing, on-line or off-line, the correction value(s) is applied into gain and dark corrected image data using the correction, such as based on the equation #3 or #7. In the step 1005, the color overlay alignment image may be used to check the LE or HE registration, and correct the detection device. In the step 1006, user may tune the registration off-line. This may be performed by adjusting SDD, SOD values. The correction process may then re-apply the correction off-line based on re-calculated correction values.

Figure 11:
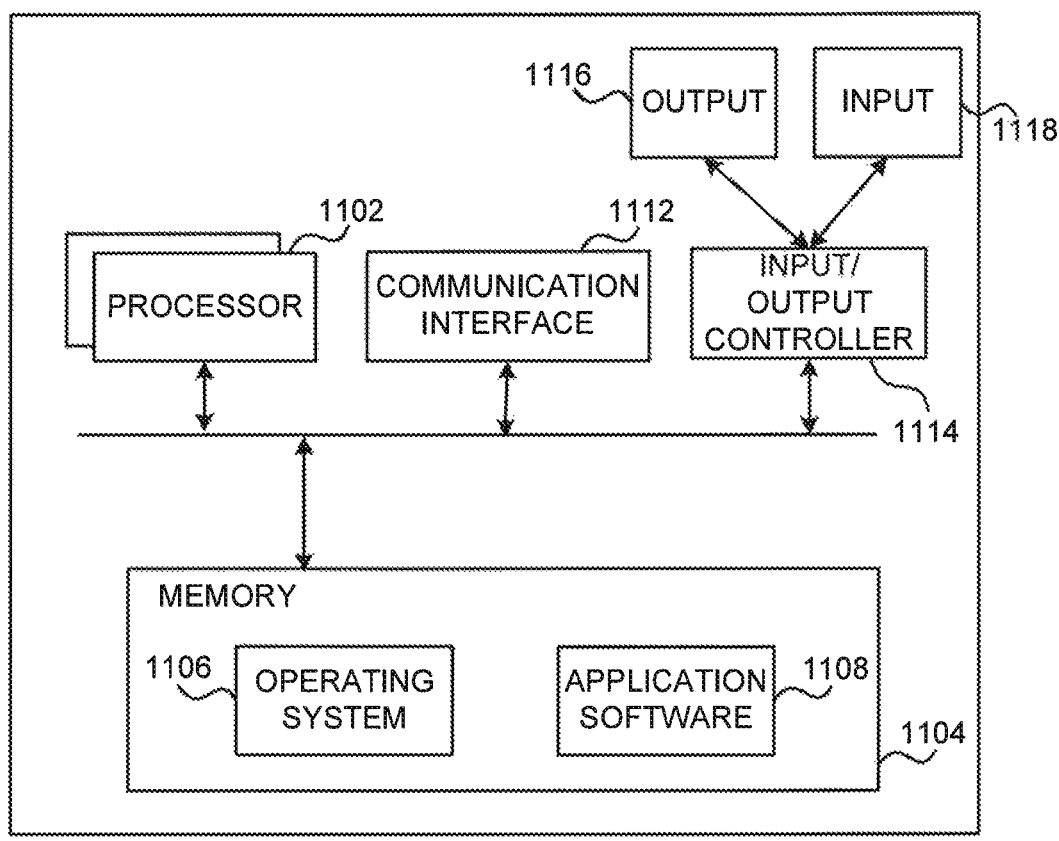
FIG. 11 is a block diagram of one illustrative example of the computing device.

FIG. 11 illustrates an example of components of the ionizing detection device and/or a correction device of the ionizing detection device, which may be implemented as any form of a computing and/or electronic device. The device comprises one or more processors 1102 which may be microprocessors, controllers or any other suitable type of processors for processing computer executable instructions to control the operation of the device. Platform software comprising an operating system 1106 or any other suitable platform software may be provided at the device to enable application software 808 to be executed on the device.

The correction may be performed by software, form example in a software library level. Computer executable instructions may be provided using any computer-readable media that is accessible by the device. Computer-readable media may include, for example, computer storage media such as memory 1104 and communications media. Computer storage media, such as memory 1104, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1104) is shown within the device, it will be appreciated that the storage may be distributed or located remotely and accessed via a network or other communication link (e.g. using communication interface 1112).

The device may comprise an input/output controller 1114 arranged to output information to a output device 1116 which may be separate from or integral to the device. The input/output controller 1114 may also be arranged to receive and process input from one or more input devices 1118, such as a user input device (e.g. a keyboard, camera, microphone or other sensor). In one example, the output device 1116 may also act as the user input device if it is a touch sensitive display device, and the input is the gesture input such as a touch. The input/output controller 1114 may also output data to devices other than the output device, e.g. a locally connected printing device.

The correction may also be performed by firmware. Alternatively, or in addition, the functionality described herein can be performed, at least in part, by one or more hardware logic components. For example, and without limitation, illustrative types of hardware logic components that can be used include Field-programmable Gate Arrays (FPGAs), Application Specific Integrated Circuit (ASICs), Program-specific Standard Products (ASSPs), System-on-a-chip systems (SOCs), Complex Programmable Logic Devices (CPLDs), Graphics Processing Units (GPUs).

The term 'computer', 'computing-based device', 'device', or 'apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, personal digital assistants and many other devices.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising an image data correction device and an ionizing radiation detection device, wherein the ionizing radiation detection device is configured to detect ionizing radiation in a plurality of energy ranges transmitted through an object to which radiation is irradiated from a radiation source, the radiation detection device comprising:
   a first detector for detecting ionizing radiation in a first energy range that is transmitted through the object to generate first radiation image data;
   at least a second detector configured in parallel to and side by side the first detector with a gap sandwiched between the first and the second detectors, for detecting ionizing radiation in a second energy range that is transmitted through the object to generate second radiation image data, wherein the first and the second energy ranges are different; characterised by
   the first and the second detectors are configured to receive the ionizing radiation concurrently so that the first and the second image data are generated and sampled concurrently;
   wherein the image data correction device comprises;
      at least one processor, and
      at least one memory storing program instructions that, when executed by the at least one processor, cause the device to: digitally determine a correction value for the second radiation image data based on a width of the gap and a pixel pitch so that a dimensional sampling is equal to the pixel pitch, wherein the correction value is configured to the correction of images for geometrical aspects.

2. The device of claim 1, wherein the pixel pitch is equal to a width of the first detector.

3. The device of claim 1, wherein a sampling of the first and the second radiation image data is performed prior to determining the correction value, and the correction value is configured to be determined in a digital domain.

4. The device of claim 1, wherein the program instructions is further configured to cause the device to: correct the second radiation image data based on the correction value.

5. The device of claim 1, further wherein the correction value is configured to be manually received.

6. The device of claim 1, wherein the correction value, Zcorr, is determined by an equation:

$$Zcorr=Z\_GAP/PW=Z\_GAP/M*(1/PW), \text{ wherein}$$

Z_GAP represents the width of the gap,

PW represents a pixel pitch, such as a width of the first detector,

M represents a system geometric magnification based on M=SDD/SOD, wherein SDD represent a distance between the radiation source and the detectors and SOD represents a distance between the radiation source and the object.

7. The device of claim 1, wherein a corrected value for the second detector is determined by an equation:

$$HEC_{i,ch}=(1-Zcorr)*HE_{i,ch}+Zcorr*HE_{i+1,ch},$$

wherein i represents a line or sample index in the scanning direction, and ch represents a pixel index.

8. The device of claim 1, wherein a ration R between the gap Z_GAP and the pixel pitch PW is determined by an equation:

$$RATIO=Z\_GAP\_P/PW=Z\_GAP/M*(1/PW).$$

9. The device of claim 1, wherein a first correction value and a second correction value is defined as follows:
the first correction value represents a rounded-down integer part of the RATIO added with one; and
the second correction value represents a decimal part of the RATIO.

10. The device of claim 1, wherein a corrected value HEC is based on an equation:

$$HEC_{i,ch}=(1-Zcorr)*HE_{i+zoff,ch}+Zcorr*HE_{i+zoff+1,ch},$$

wherein i represents a line or sample index in a scanning direction, and ch represents a pixel index.

11. The device of claim 1, further wherein the first radiation image data image is input to a blue channel and a green channel, and the second radiation image data is input to a red channel.

12. The device of claim 1, wherein the second detector is configured to a higher energy than the first detector.

13. The device of claim 1, wherein the radiation detection device further includes a plurality of detectors configured in parallel to each other.

14. The device of claim 1, wherein a corrected value for the n:th detector is determined by an equation:

$$En_{i,ch}=(1-Zcorr\_m)*En_{i+zoff\_m,ch}+Zcorr\_m*En_{i+zoff\_m+1,ch},$$

wherein m=n−1, and n represents the n:th detector.

15. A computer-readable storage medium comprising executable instructions for causing at least one processor of a computing apparatus to perform operations comprising:
detecting, by a first detector, ionizing radiation in a first energy range that is transmitted through the object to generate first radiation image data;
detecting, by a second detector configured in parallel to and side by side the first detector with a gap sandwiched between the first and the second detectors, ionizing radiation in a second energy range that is transmitted through the object to generate second radiation image data, wherein the first and the second energy ranges are different; wherein
receiving, by the first and the second detector, the ionizing radiation concurrently so that the first and the second image data are generated and sampled concurrently; and
determining a correction value for the second radiation image data based on a width of the gap and a pixel pitch so that a dimensional sampling is equal to the pixel pitch.

16. A method, comprising
detecting, by a first detector, ionizing radiation in a first energy range that is transmitted through the object to generate first radiation image data;
detecting, by a second detector configured in parallel to and side by side the first detector with a gap sandwiched between the first and the second detectors, ionizing radiation in a second energy range that is transmitted through the object to generate second radiation image data, wherein the first and the second energy ranges are different; wherein
receiving, by the first and the second detector, the ionizing radiation concurrently so that the first and the second image data are generated and sampled concurrently; and
determining a correction value for the second radiation image data based on a width of the gap and a pixel pitch so that a dimensional sampling is equal to the pixel pitch, wherein the correction value is configured to the correction of images for geometrical aspects.

* * * * *